(12) United States Patent
Forlivio

(10) Patent No.: US 7,887,140 B1
(45) Date of Patent: Feb. 15, 2011

(54) AUTOMOBILE SEAT WITH INTEGRAL CHILD SAFETY RESTRAINING ASSEMBLY

(76) Inventor: Joseph Forlivio, 65 Bennett Ave., Yonkers, NY (US) 10701

( * ) Notice: Subject to any disclaimer, the term of this patent is extended or adjusted under 35 U.S.C. 154(b) by 0 days.

(21) Appl. No.: 12/655,031

(22) Filed: Dec. 21, 2009

(51) Int. Cl.
B60N 2/26 (2006.01)

(52) U.S. Cl. .................. 297/488; 297/238; 297/256.15

(58) Field of Classification Search ............... 297/238, 297/256.15, 487, 488
See application file for complete search history.

(56) References Cited

U.S. PATENT DOCUMENTS

| | | | | | |
|---|---|---|---|---|---|
| 2,533,527 | A | * | 12/1950 | Soltis | 297/256 |
| 2,633,906 | A | * | 4/1953 | Franz | 297/488 |
| 2,723,709 | A | * | 11/1955 | Welsh | 297/255 |
| 3,094,354 | A | | 6/1963 | Bernier | |
| 3,146,026 | A | * | 8/1964 | Berlin | 297/255 |
| 4,230,366 | A | | 10/1980 | Ruda | |
| 4,540,216 | A | | 9/1985 | Hassel | |
| 4,679,806 | A | * | 7/1987 | Gingline | 280/47.38 |
| 4,749,229 | A | | 6/1988 | Derto | |
| 4,756,573 | A | * | 7/1988 | Simin et al. | 297/250.1 |
| 4,913,498 | A | * | 4/1990 | Forlivio | 297/488 |
| 4,986,600 | A | * | 1/1991 | Leblanc et al. | 297/238 |
| 5,286,091 | A | * | 2/1994 | Busch | 297/487 |
| 5,511,850 | A | * | 4/1996 | Coursey | 297/216.11 |
| 7,261,381 | B2 | * | 8/2007 | Tsai | 297/488 |

* cited by examiner

Primary Examiner—Peter R. Brown
(74) Attorney, Agent, or Firm—Abelman, Frayne & Schwab

(57) ABSTRACT

A seat includes at least a pair of child restraining members which are selectively moveable to an extended position to restrain an infant or small child, or a restraining for a larger child, the seat back including a fixed portion providing a back support for an infant or child which is extended in surface area upon retraction of one of the child restraint's, forming a comfortable back support for a larger child, the respective child restraints when retracted into the seat back forming a comfortable back support for an adult. At least one child restraining member can pivot away horizontally from an exit, allowing ease of exit of the child from the child restraining device. A locking mechanism prevents the child restraining member from inadvertent pivoting horizontally during use. Apertures in the joints of the child restraining assembly allow the child restraining assembly to be mounted to the support bar of the car seat.

12 Claims, 5 Drawing Sheets

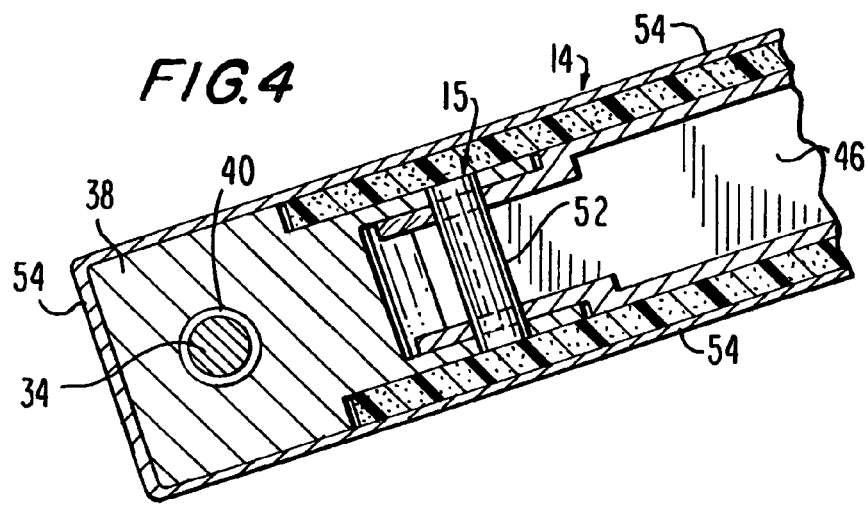
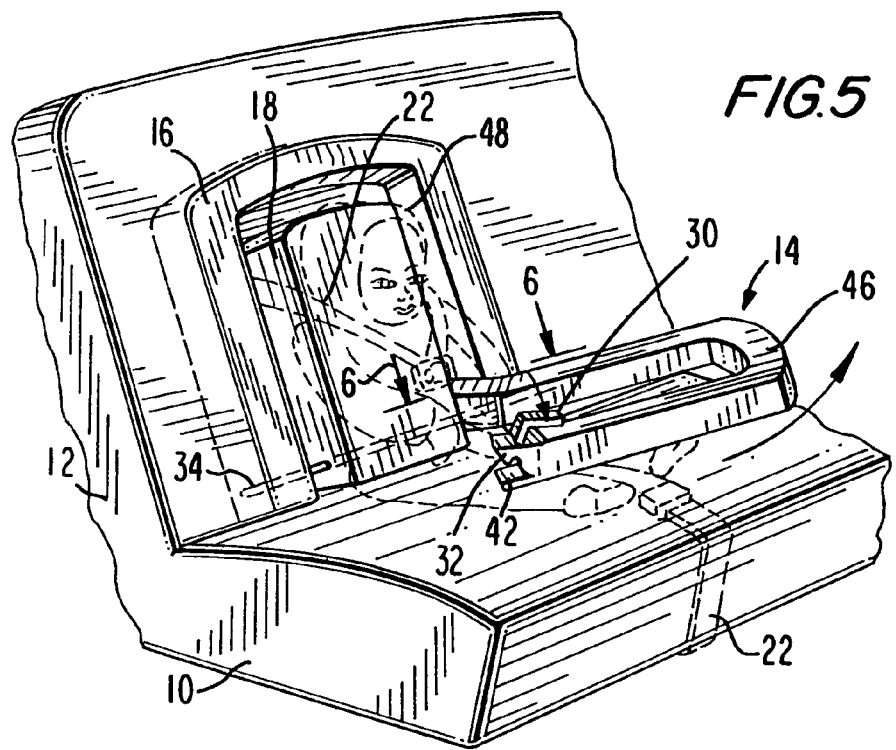
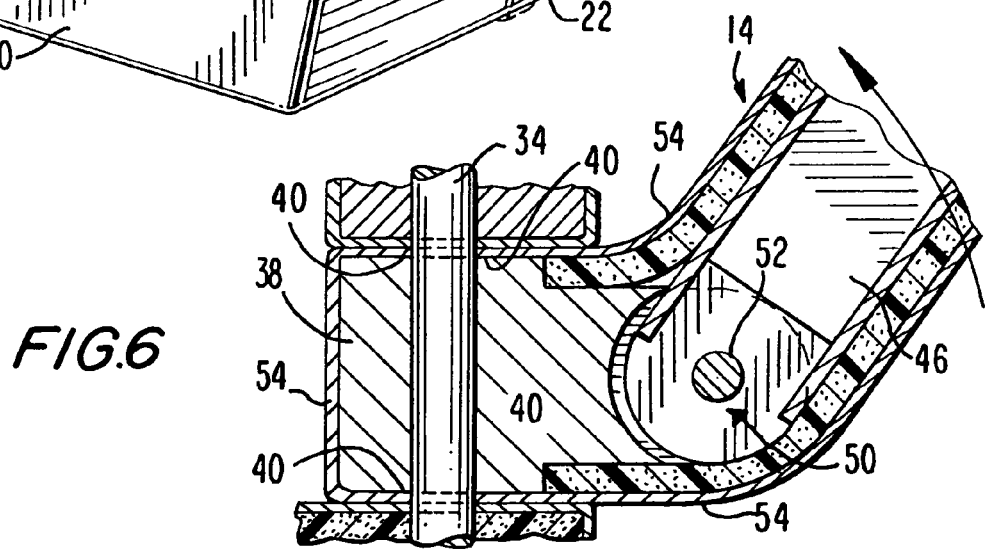

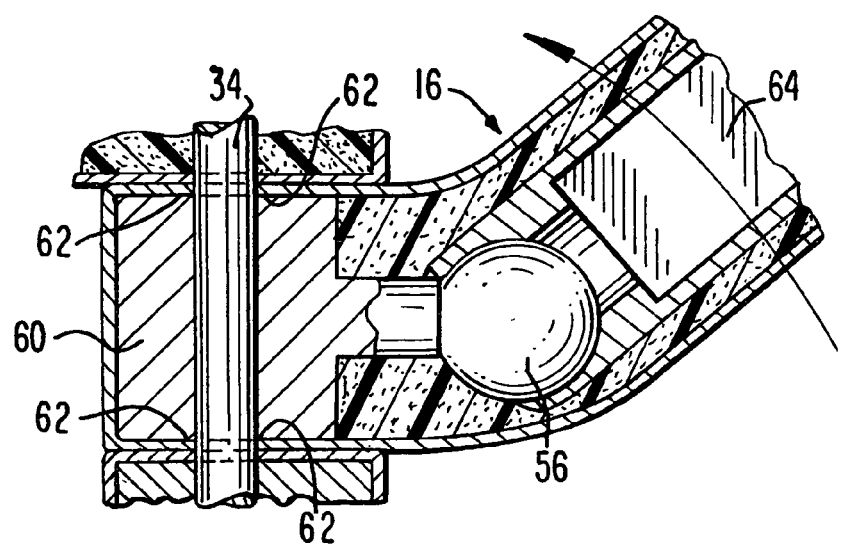
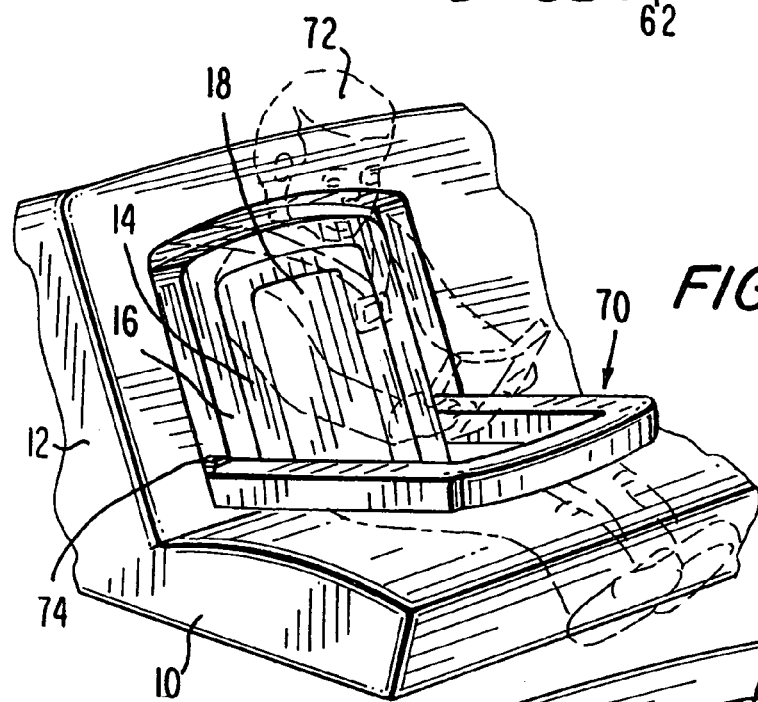
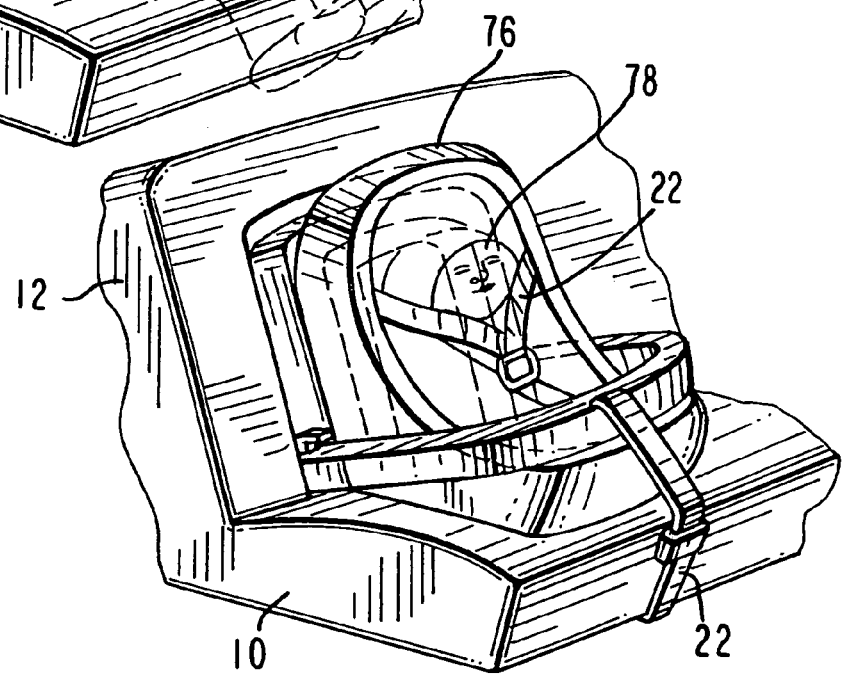

AUTOMOBILE SEAT WITH INTEGRAL CHILD SAFETY RESTRAINING ASSEMBLY

1. FIELD OF THE INVENTION

This invention relates to seats, particularly automobile seats, that are equipped with multiple safety restraining devices for use by an infant or young child.

2. BACKGROUND OF THE INVENTION

The requirement for restraining devices, such as seat belts and the like, including devices for the restraint of an infant or young child, is mandatory in most states of this country.

Typically, such child restraining devices are independent seating structures constructed for attachment to the back of an automobile seat, and secured in position by the existing seat belts, or by ancillary belts that have been provided for that specific purpose. Such devices constitute an inconvenience to the user of the automobile, in that the device must be removed and stored if the automobile seat is to be used by an adult. Also, the occasion arises that the child restraining is required, but, the child restraining has been stored at some other location and is not readily available for use. Additionally, storage of the child restraining in the trunk of the automobile can constitute a source of inconvenience, in that it restricts the amount of available trunk space.

Structures have been disclosed in which the child restraining means is formed integrally with the back of an automobile seat, and, rotated or extended for temporary use by a child or infant, and then rotated back into the seat back to enable the automobile seat to be used by an adult. Examples of such constructions of child restraining devices are to be found in Bernier U.S. Pat. No. 3,094,354 issued Jun. 18, 1963, in Ruda U.S. Pat. No. 4,230,366 issued Oct. 28, 1980, in Hassel U.S. Pat. No. 4,540,216 issued Sep. 10, 1985, and, in Dorto U.S. Pat. No. 4,749,229 issued Jun. 7, 1988.

Each of these prior patents discloses a restraining device incorporated into the back of an automobile seat and which can be rotated downwardly to extend out of the seat back. However, in each instance, no provision is made for the accommodation of children of different weights and sizes. Thus, the child restraints of the prior art are only of utility in providing a restraining device for either an infant, but not a small child, or, a small child but not an infant, or, a child of a specific size and weight.

An improved restraining mechanism having moveable and retractable restraining devices is described in Forlivio U.S. Pat. No. 4,913,498 issued Apr. 3, 1990, the disclosure of which is incorporated herein in its entirety by reference.

It is an object of this invention to provide a child restraining means of the type incorporated into the back of an automobile seat that can accommodate infants or children of different weights and sizes that can be stored in the back of the automobile seat in a manner returning the automobile seat to its general usage as a seat for an adult, and which also allows for ease of exiting the restraining mechanism when the automobile is stationary.

It is a further object of the invention to provide a structure that is simple to construct, reliable in operation and maintains the overall safety of the restrained infant or child passenger during use.

SUMMARY OF THE INVENTION

A seat construction having at least one child restraining arm which can pivot away horizontally from its lowered and secured position, to enhance the ease of exiting the restraining mechanism while maintaining the overall safety of the restrained passenger, such as an infant or child. A locking mechanism prevents the horizontally pivotable child restraining arm from inadvertently pivoting open during use.

The present invention comprehends the improvement of at least two separate upholstered and padded U-shaped restraining arms or members which are hingedly or pivotally mounted in the back of an automobile seat where they are stowed and form a part of the upholstered back support, and which are independently rotatable downwardly and also pivotally mounted on one side to swing away in a generally horizontal plane to permit easy entry or exiting of the child, or removal of an infant supporting device that is secured by the arm.

The plurality of U-shaped arms provide a child restraining arm or member appropriate for use with an infant, or, one that is appropriate for a child of a specified height and weight.

When the child restraining device is used with a child, a single restraining arm is employed and swung away after releasing one side to permit the child to exit without having to raise the U-shaped arm to the stowed position.

When employed for restraining a small child, both of the child restraining arms can be pivotally moved downwardly into an extended position to provide a play surface for the infant, a central portion of the seat back providing a back support for the child and then released to swing away from the child to provide easy access and/or removal from the seat.

If the restraining device is not required for use by an infant or child, then, the restraining arms are rotated into their stowed positions to form an integral back-supporting surface for one or more passengers seated on the back seat.

When the automobile is stationary and the child restraining arms are not in use such that the infant or child is to exit or to be removed from the automobile, at least one child restraining arm can pivot away horizontally from an exit, allowing ease of exit of the child. A locking mechanism prevents the horizontally pivotable U-shaped child restraining arm from inadvertently pivoting in either direction, i.e., horizontally or vertically, during use. In a preferred embodiment, an interlocking mechanism prevents the U-shaped arm from being raised vertically when it is unlocked for horizontal movement.

The assembly of the present invention includes at least a pair of generally U-shaped child restraints which are selectively moveable from a stowed to an extended position to restrain an infant or small child, or a restraining arm for a larger child, the seat back including an intermediate fixed portion providing back support for an infant or child which is extended in surface area upon stowing of one of the child restraining members to provide a comfortable back support for a larger child, the respective child restraining arms when in their stowed position in the seat back, forming a comfortable back support for an adult. At least one child restraining arm can pivot away horizontally from an exit, allowing easy entry or egress of the child from the child restraining member. A locking mechanism prevents the child restraining arm from inadvertently pivoting during use. Apertures in the joints of the child restraining arm permit it to be mounted to the support bar of the car seat.

The invention can be employed with either conventional bench seats or with bucket seats. In accordance with current automobile safety recommendations, children below a certain height are to be accommodated on the rear seat to avoid the risk of injury that can occur in the event that a front seat airbag is inflated. With the advent of other safety features, the child restraining system can be installed in automobile bucket seats, and on seats in public conveyances where the need exists, such as taxicab, bus and airplane seats.

BRIEF DESCRIPTION OF THE DRAWINGS

Preferred embodiments of the invention are described below and with reference to the drawings wherein:

FIG. 4 is a side cross-sectional view of the vertical pivot mechanism of FIG. 3 along lines 4-4 in FIG. 3;

FIG. 5 is a perspective view of the child restraining mechanism of FIG. 1, and showing the inner restraint in an extended open position;

FIG. 6 is a top cross-sectional view of the vertical pivot mechanism of FIG. 3 along lines 6-6 in FIG. 5 showing the pivoting of the hinge;

FIG. 10 is a side cross-sectional view of the pivot mechanism of FIG. 6 along lines 10-10 in FIG. 9 showing the pivoting of the ball-and-socket mechanism;

FIG. 11 is a perspective view of an alternative embodiment of the child restraining mechanism of FIG. 1, including a third child restraint in an extended closed position usable by a larger child;

FIG. 12 is a perspective view of the child restraining mechanism of FIG. 11, showing the third child restraint in an extended closed position usable to restrain a child car seat containing a child;

DETAILED DESCRIPTION OF THE INVENTION

As illustrated in FIGS. 1-12, a seat includes restraining mechanisms according to the present invention for use in vehicles, for example, in the backseat of an automobile, for restraining passengers, such as infants, small children and larger children, and also infants and smaller children in car seats. The restraining mechanisms of the present invention include some common features of moveable restraining devices described in U.S. Pat. No. 4,913,498, which is incorporated herein in its entirety.

Figure 2:
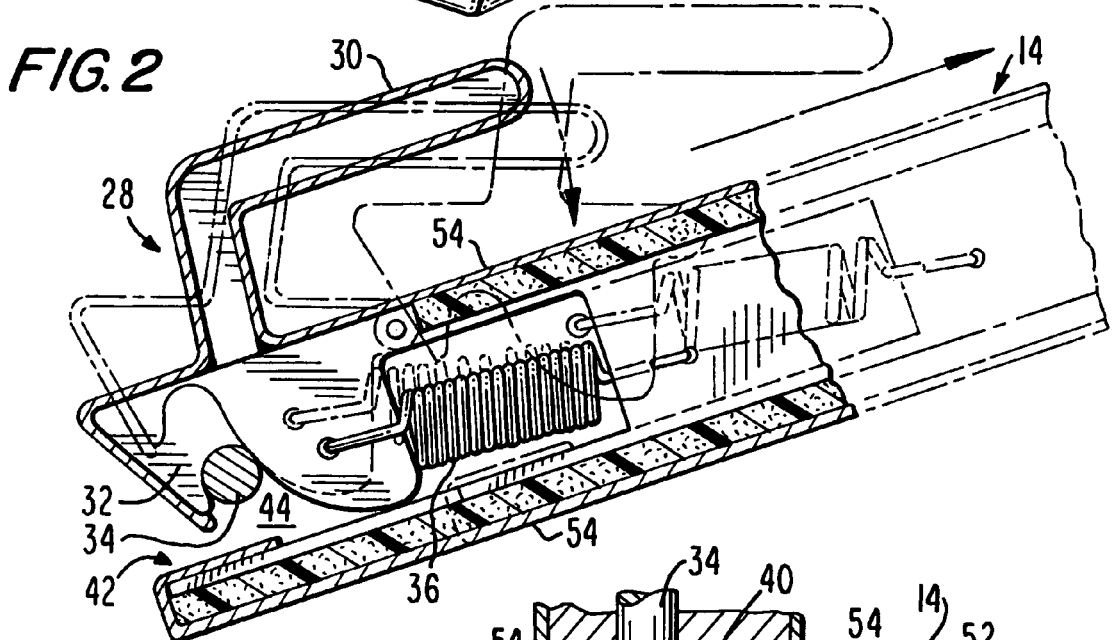
FIG. 2 is a side cross-sectional view of a lock and release mechanism along lines 2-2 in FIG. 1.

The automobile seat includes a seat portion 10 and a seat back 12 which incorporates at least two upholstered and padded U-shaped child restraining members 14 and 16, which respectively surround a seat back portion 18, forming the child restraining mechanism of the present invention when lowered to an extended position usable by an infant or child, similar to the extended position shown in FIG. 2 of U.S. Pat. No. 4,913,498, identified above. Accordingly, the child restraining system of the present invention can permit the child restraints 14 and 16 to be pivoted and moved to a retracted stowed position in which the automobile seat is usable by a teenager or adult, to provide a substantially continuous support surface for the back of an adult, thus closely approximating the seat back of a conventional automobile seat.

Figure 1:
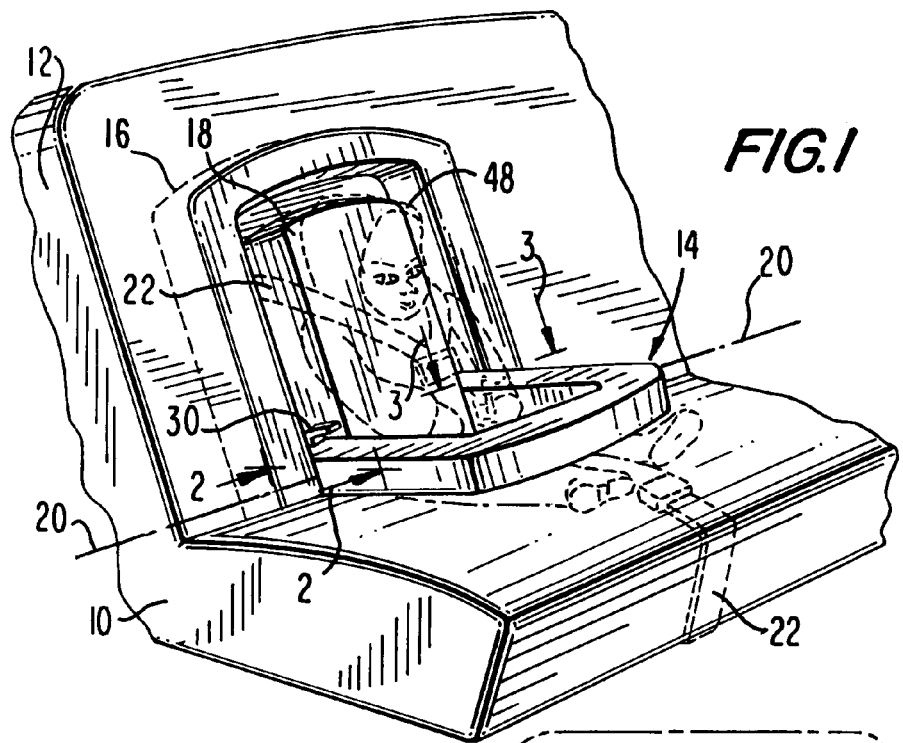
FIG. 1 is a perspective view of an automobile seat incorporating the child restraining mechanism of the present invention, and showing an inner restraint in an extended closed position usable by an infant or child.

Referring to FIG. 1 of the present invention, the seat back portion 18 is an integral part of the seat back 12 and is fixed and immovable relative thereto, the respective child restraints 14 and 16 being selectively moveable relative to each other and relative to the seat back 12. What can be termed herein as the restraining mechanism is provided, in one embodiment, by the inner restraining arm 14, which is rotated downwardly out of the seat back 12 through an angle of approximately 90° about a pivot axis 20 common to both the inner restraint 14 and the outer restraint 16. In this position of the inner restraint 14, it will be seen that the fixed central seat back portion 18 provides back support for the infant or small child.

If the child support is to be used for an infant or small child, then, the outer restraint 16 also can be rotated down into registry with the inner restraint 14, the upper surfaces of the child restraints 14 and 16 then providing a wider padded play surface for the infant or child.

If now the child restraining system is to be employed for restraining a larger child, the inner restraining arm 14 remains in the stowed position and the outer restraint 16 is pivotally lowered to its extended position. In this orientation of the child restraints 14 and 16, the inner restraint 14 provides an extension of the seat back portion 18, thus providing a comfortable back support for a larger child.

In addition to the child restraints 14 and 16, the automobile seat portion 10 is also provided with the safety waist and cross-body seat belts, indicated at 22 which can extend over the lap of the infant or child. These belts are incorporated into the restraining system of the invention and supplement the standard OEM adult seat belts that are provided with the vehicle.

As will be appreciated, various modifications can be made to the structure as described above. For example, locks can be provided associated with the respective child restraints 14 and 16 for locking them in the extended or lowered position, such that they cannot be raised by a child who pushes upwardly against the underside of the extended restraining arms 14 and 16. Additionally, other forms of restraints, such as a specially sized harness, can be provided for the infant or child.

Referring to a first embodiment in FIGS. 1-6, either of the child restraints 14 and 16, are constructed to releasably pivot away horizontally from an exit, such as the open door of the automobile, allowing ease of egress of the child when the automobile is stationary and a parent is assisting in the removal of the child from the automobile. One or both of the child restraints 14 and 16 includes a vertical pivot axis to permit the arm to pivot away horizontally from the locked position, as shown in FIG. 5.

One or both of the child restraints 14 and 16 also includes a locking mechanism, such as the lock and release mechanism 28 in FIGS. 1-2 of the present invention for the inner restraint 14 in an example embodiment, which prevents the inner restraining arm 14 from inadvertent horizontal pivoting during use. In the embodiment shown in FIG. 2 of the present invention, the lock and release mechanism 28 is provided for retaining the inner restraint 14 in a closed position; that is, with the inner restraining arm 14 movable vertically about the axis 20, but not movable to pivot horizontally. The lever 30 is capable of being pushed downward to disengage a hook-shaped end 32 from a frame 34 about which the child restraints 14 and 16 are vertically pivotally engaged. The frame 34 can be a rod or support bar extending through the seat portion 10 which coincides with the axis 20, and which can secure the seat portion 10 to a frame member of the automobile. A resilient member, such as a spring 36, can be provided to bias the lever 30 downward to engage the end 32 unless a user applies a sufficient downward force to release the end 32 from the frame 34. The spring constant of the spring 36 can be sufficiently high to require the strength of an adult to press the lever 30, and thus a child in the child restraints 14 and 16 cannot inadvertently disengage the lock and release mechanism 28.

The lock and release mechanism 28 can be at least one a snap-release lock respectively attached to each of the child restraining arms 14 and 16 for engaging the frame 34 to releasably secure the arms in the closed position.

A generally vertical mounting axis permits each of the child restraints 14 and 16 to pivot away horizontally from the exit to position the respective child restraints 14 and 16 in an open position. The child restraints 14 and 16 comprises: a frame attachment member for attaching the arms 14 and 16 to the frame 34, a restraining arm for partially encircling the child, and a pivot mechanism including a generally vertical axle and means for pivotally mounting the respective restraining arms for horizontal movement about the axis.

Figure 3:
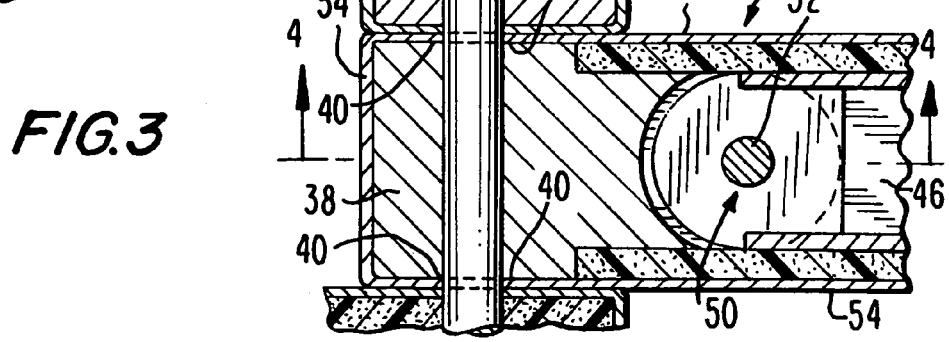
FIG. 3 is a top cross-sectional view of a vertical pivot mechanism including a hinge along lines 3-3 in FIG. 1 with the inner restraint in a closed position.

In the embodiment shown in FIGS. 1-6, the horizontally pivoting end of the inner restraint 14 is shown in FIGS. 3 and 4, in which the frame attachment member 38 includes apertures 40 pivotally attaching the inner restraint 14 to the frame 34 in a horizontally pivotal engagement to permit the inner restraint 14 to be moved from the stowed position to the extended position shown in FIG. 1. Similarly, referring to FIG. 2, the end 32 and the opposing portion 42 of the restraint 14 forms an aperture or space 44 for attaching the inner restraint 14 to the frame 34 in a horizontally pivotal engagement to permit the inner restraint 14 to be moved from the secured stowed position to the extended position shown in FIG. 1.

Referring again to FIGS. 3-4, the restraining body 46 of the inner restraint 14 partially encircles the child 48, and a pivot mechanism 50 includes the generally vertical axle 52 for pivotally mounting the restraining body 46 of the inner restraint 14 to the frame attachment member 38 to horizontally pivot about the generally vertical axis 52.

Accordingly, as shown in FIGS. 5 and 6, with the lever 30 pushed down and the end 32 of the lock and release mechanism 28 released from the frame 34, the restraining body 46, constituting the major portion of the inner restraining arm 14, pivots horizontally away from the exit, allowing the child 48 to be removed from the seat portion 10.

Each of the child restraints 14 and 16 can be composed of metal or other rigid materials, and preferably includes an outer covering 54 overlaying the metal to provide cushioning or padding as well as an upholstery material to match or coordinate with the upholstery of the seat portion 10 and/or the seat back 12. The outer covering 54 can be composed of flexible and/or stretchable materials such as plastic, cloth, or the like allowing the lock and release mechanism 28 to pivot as shown in FIG. 2 as well as the pivot mechanism 50 to pivot as shown in FIG. 6 without exposing the inner construction materials of the restraints 14 and 16.

In the example embodiment shown in FIGS. 3 and 4, the pivot mechanism 50 can be a hinge or, alternatively, a pin-through-the-top mechanism. In another alternative embodiment shown in FIGS. 7-10 in which the outer restraining arm 16 pivots horizontally away from the exit, the pivot mechanism 50 can be a ball-and-socket 56.

Figure 7:
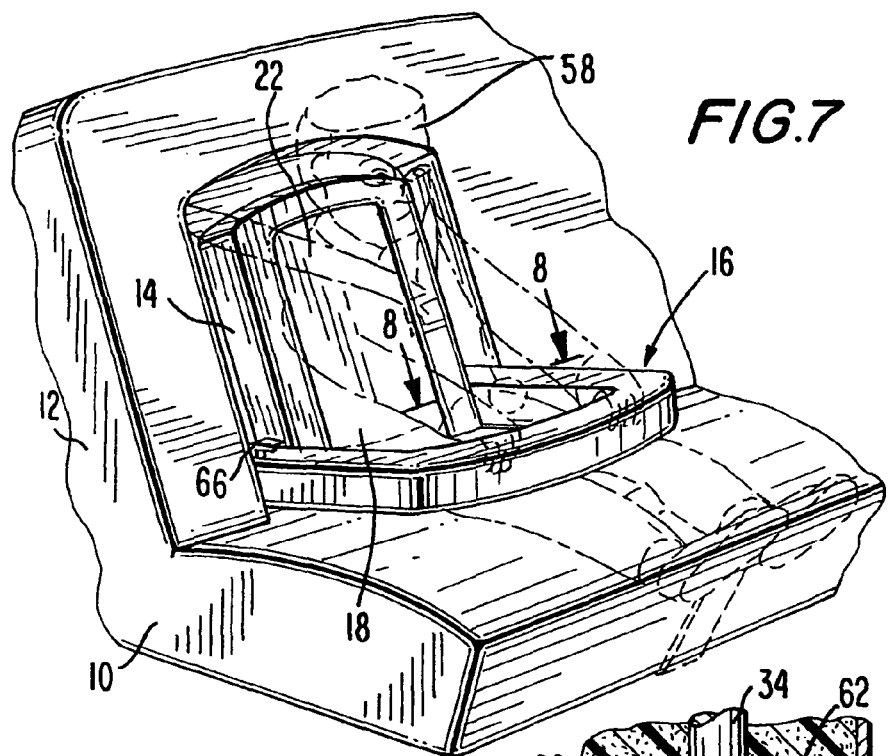
FIG. 7 is a perspective view of the child restraining mechanism of FIG. 1, and showing an outer restraint in an extended closed position usable by a large child.

With reference to FIGS. 7-10, the larger outer restraining arm 16 accommodates and restrains a larger child 58 as shown in FIG. 7 and is secured by the lock and release mechanism 28 with the lever 30 engaging the frame 34.

Figure 8:
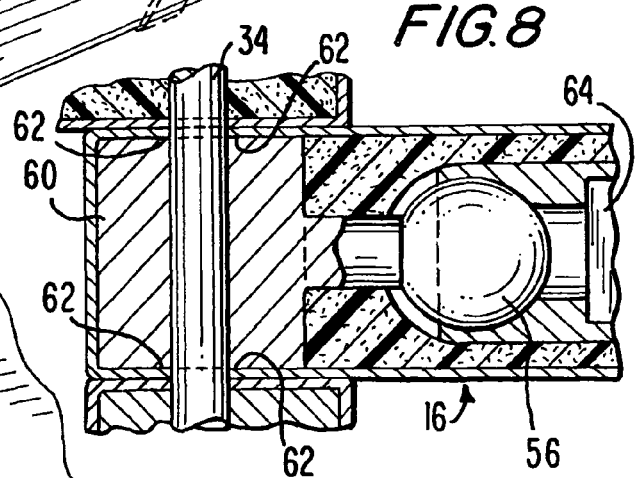
FIG. 8 is a top cross-sectional view of a pivot mechanism including ball-and-socket mechanism along lines 8-8 in FIG. 7.

Referring to FIG. 8, the outer restraining arm 16 includes a frame attachment member 60 having apertures 62 for attachment to the frame 34 in a horizontally pivoting engagement to permit the outer restraint 16 to be moved from the stowed position to the extended position shown in FIG. 7. Similarly, referring to FIG. 2, the outer restraint 16 also includes a corresponding lock and release mechanism with an end and an opposing portion of the outer restraint 16 which form an aperture for attaching the outer restraint 16 to the frame 34 in a horizontally pivotal engagement to permit the outer restraint 16 to be moved from the retracted position to the extended position shown in FIG. 7.

Referring again to FIG. 8, the restraining body 64 of the outer restraint 16 partially encircles a larger child 58, and the pivot mechanism 50 permits pivoting about a vertical axis for pivotally mounting the restraining body 64 of the outer restraint 16 to the frame attachment member 60 to horizontally pivot about the axis.

Figure 9:
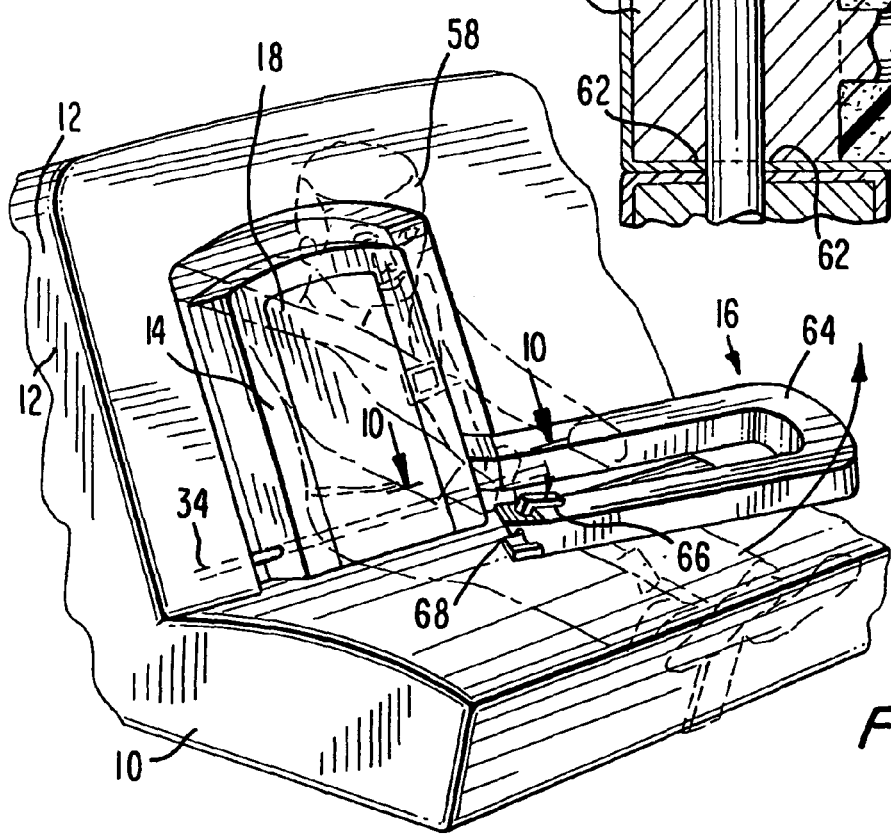
FIG. 9 is a perspective view of the child restraining mechanism of FIG. 7, and showing the outer restraint in an extended open position.

Accordingly, as shown in FIGS. 9 and 10, with the lever 66 of a corresponding lock and release mechanism on one end of the outer restraint 16 being pushed downward and the end 68 of the lock and release mechanism released from the frame 34, the restraining body 46, constituting the bulk of the outer restraint 16, pivots horizontally away from the exit, allowing the child 58 to easily move from the rear seat 10.

Figure 13:
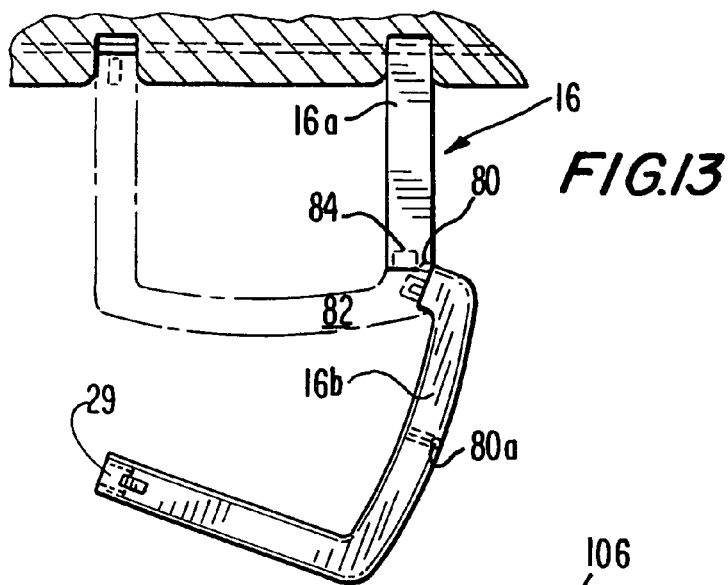
FIG. 13 is a perspective view of an alternative embodiment in which a portion of the lowered arm remains fixed with respect to the frame and the remaining portion swings away.

A further embodiment of the swing-away restraining arm, which can be used with one or all of the U-shaped arms is illustrated in FIG. 13. In this embodiment, the arm, referred to as 14, is provided with a hinge or other pivot means 80 between arm portions 16a and 16b. In this embodiment, section 16a is rigidly affixed to the supporting frame member and need not pivot. The free end portion 16b of the arm 16 is provided with a locking mechanism 29 that engages with a cooperating member secured to the frame (not shown) and the accompanying safety release mechanism, such as described above.

As will be understood, in this embodiment of a pivoting or articulated restraining arm, the child can be easily positioned or removed from the seated position without disturbing a passenger sitting adjacent the stationary portion 16a of the arm. It is also to be understood that the hinge 80 can be located at other positions on the arm, for example on the directly opposed position so that only a shorter section of the pivot arm corresponding to 16a, but on the opposite side, would be releasable. Likewise, the hinge 80 can be positioned centrally on arm 16 so that one-half of the arm, corresponding in part to portion 16a, remains generally stationary, while the other half swings away. As will be appreciated by one of ordinary skill in the art, the stationary portion corresponding to 16a, can be constructed to pivot horizontally a few degrees to allow the release of locking member 39 and permit it to rotate about the hinge 80, wherever it is positioned.

It is to be understood that alternative embodiments are comprehended by the improvement of the present invention. For example, the restraining mechanism of the present invention can include a third U-shaped child restraining member 70, as shown in FIG. 11, that is mounted for pivotal movement about a generally horizontal axis in the frame 34 between the stowed position in which the third child restraint 70 provides a continuation of the external surface of the seat back 12, and an extended position shown in FIG. 11 for use as a child restraint for a larger child 72 disposed in the seat portion 10. As will be apparent to one of ordinary skill in the art, the components of the third child restraint 70 can correspond generally to the components of the child restraints 14 and 16, including the lever 74 shown in FIG. 11 for use with a corresponding lock and release mechanism which operates according to the description of the lever 30 and the lock and release mechanism 28 described above in conjunction with FIG. 2.

The dimensions of the inner restraint 14 and the outer restraint 16 and, alternatively, the third child restraint arm 70, increase to accommodate larger children, from infants to teens of relatively small stature. The child restraints 14, 16, and 70 are generally concentrically mounted, and individually deployed to the extended positions as needed, for example, with the inner restraint 14 dimensioned to accommodate a child smaller than a first maximum size, the outer restraining 16 dimensioned to accommodate a child smaller than a second maximum size larger than the first maximum size, and the third child restraint 70 dimensioned to accommodate a passenger smaller than a third maximum size and larger than the second maximum size.

In another alternative embodiment, at least one of the child restraints 14, 16, and 70 shown in FIG. 11 can be dimensioned to accommodate a removable child's car seat 76, as shown in FIG. 12, into which an infant or small child 78 is positioned and independently retained. The removable car seat can be of conventional design or configured and adapted for a more secure mating and engagement with one of the generally U-shaped restraining arms.

Figure 14:
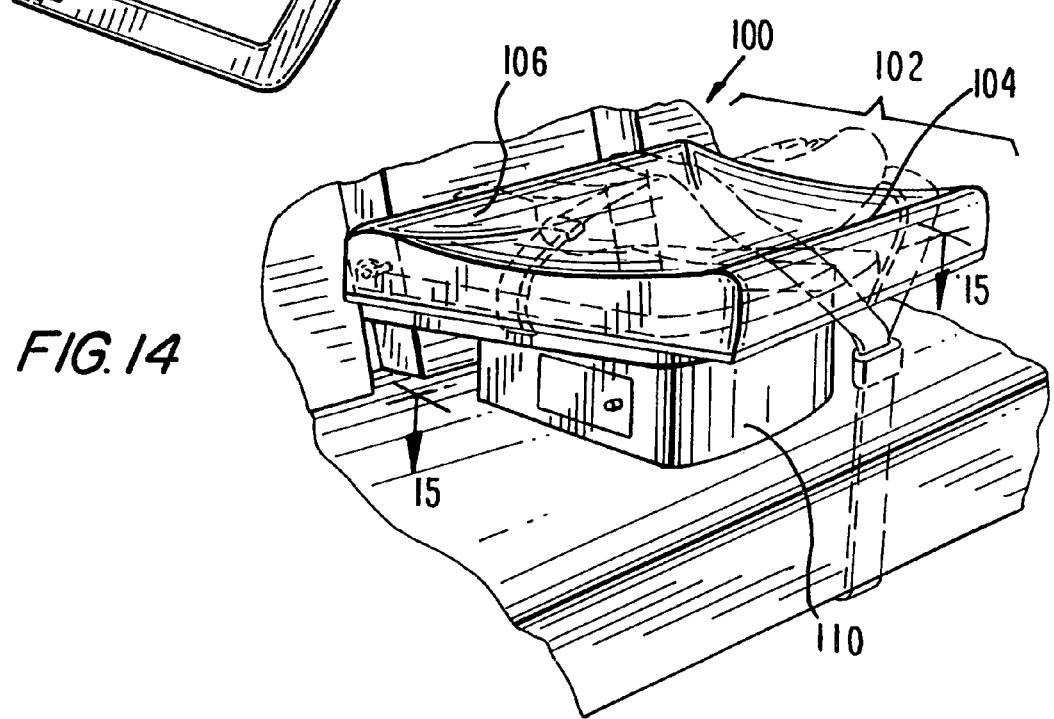
FIG. 14 is a perspective view of an infant cradling and support adapted for use with the swing away restraining system.
Figure 15:
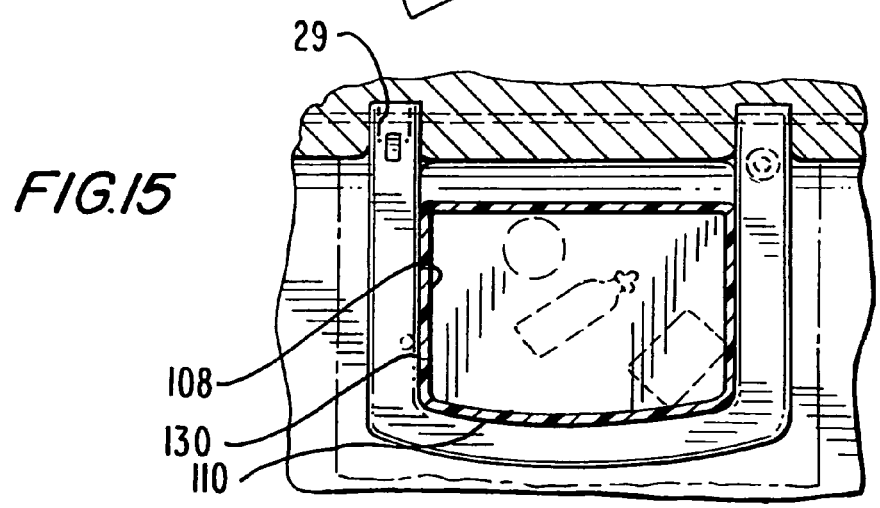
FIG. 15 is a view illustrating the use of the infant support in conjunction with the assembly of the invention.

An accessory for use with the restraining system of the invention is an infant supporting member, referred to generally as 100, that is illustrated in FIGS. 14 and 15. The infant support includes an ergonomically contoured supporting surface 102 having a head end 104 and foot section 106. Surface 102 is preferably integrally molded to a supporting base unit 108 that rests on the automobile seat and has a front surface 110 that is contoured to securely fit within the inner surface of one of the lowered U-shaped rings, e.g., restraining arm 70.

The infant support 100 is also provided with a plurality of safety straps 120 fitted with appropriate buckle fasteners 122 to securely maintain an infant positioned on the supporting surface 102, e.g., by straps passing over the shoulders and joined into an appropriate harness so that the infant cannot move forward or to the rear in the event of an impact. The forward surface 110 of supporting base 108 is higher than the rear portion so that the supporting surface 102 is at an acute angle to horizontal, which itself is contoured to raise the infant's shoulders well above a horizontal position when the carrier is placed on the seat and secured.

The hollow base can also be provided with one or more access panels or doors 109 so that the hollow base 108 can be used for storage of baby care items.

As shown in FIG. 14, the supporting surface 102 is contoured to cradle a newborn or very young baby in a shallow depression. Accessory 100 allows even infants that are not able to maintain an unsupported upright or seated position to be safely transported and easily removed from the improved restraining system of the invention by virtue of the swing-away construction.

While the preferred embodiments of the present invention have been shown and described herein, it will be obvious that each such embodiment is provided by way of example only. Numerous variations, changes and substitutions will occur to those of ordinary skill in the art without departing from the invention herein. Accordingly, it is intended that the invention be limited only by the scope of the claims that follow.

I claim:

1. A vehicle comprising an upholstered seat back having an outer surface and an integral child restraining assembly, wherein said seat back has an inverted U-shaped channel having opposite lower ends and a rigid frame member including first and second frame portions disposed, respectively, within the channel lower ends and extending horizontally across said channel, the restraining assembly further comprising;

first and second U-shaped child restraining members, each U-shaped member having first and second end portions and a connecting portion between said first and second end portions;

wherein one end portion of each U-shaped member includes a latching mechanism for selectively engaging, and disengaging from, one of the frame portions, wherein when engaging a frame portion said latching mechanism allows said first end portion only to pivot about said first or second frame portion;

wherein the other end portion of each U-shaped member includes a frame attachment portion which engages the other frame portion to allow said frame attachment portion only to pivot horizontally about said first or second frame portion;

wherein said first and second U-shape members may each independently be pivoted horizontally between a raised position, in which the first U-shaped member is nested within the second U-shaped member and both U-shaped members are disposed within said channel and have outer surfaces which are substantially flush with said seat back outer surface, and a lowered position partially encircling the child; and a coupling mechanism between each said attachment member and its associated connecting portion for allowing such connecting portion to rotate about a vertical axis when the U-shaped member is in its lowered position wherein, when a U-shaped member is in its lowered position and its latching mechanism has been disengaged, the connecting portion and latching mechanism may be rotated into an open position in which the restraining member swings away from the seated child to facilitate seating or unseating the child.

2. The child restraining assembly of claim 1, further comprising:

a locking mechanism for retaining either of said first and second U-shaped child restraining members in the lowered position.

3. The child restraining assembly of claim 2, wherein the locking mechanism is a snap-release lock attached to at least one of said U-shaped child restraining members for engaging the frame to releasably secure said first or second U-shaped child restraining member to the frame in the lowered position.

4. The child restraining assembly of claim 1, wherein the coupling mechanism is a hinge.

5. The child restraining assembly of claim 1, wherein the coupling mechanism is a ball-and-socket mechanism.

6. The child restraining assembly of claim 1, wherein the coupling mechanism is a pin-through-the-top mechanism.

7. The child restraining assembly of claim 1, wherein at least one end of each of said first or second U-shaped child restraining members includes apertures for connecting the at least one end to the frame member associated with the car seat.

8. The child restraining assembly of claim 1, further comprising:

a third U-shaped child restraining member pivotally mounted for rotational movement about a generally horizontal axis for movement between a stowed position in which said third child restraining member provides a continuation of the external surface of said seat back, and an extended position for restraining a child disposed in the seat, wherein said second U-shaped child restraining member is nested within said third U-shaped child restraining member.

9. The child restraining assembly of claim 8, wherein said first U-shaped child restraining member is dimensioned to accommodate any child smaller than a first predetermined maximum size;

said second U-shaped child restraining member is dimensioned to accommodate any child smaller than a second predetermined maximum size that is larger than the first predetermined maximum size; and said third U-shaped child restraining member is dimensioned to accommodate any child smaller than a third predetermined maximum size larger that is than the second predetermined maximum size.

10. The child restraining assembly of claim 8, wherein at least one of said first, second, and third U-shaped child restraining members is dimensioned to accommodate a removable children's car seat.

11. The child restraining assembly of claim 8, wherein said restraining members pivot about the same generally horizontal axis.

12. The child restraining assembly of claim 1, wherein said restraining members pivot about the same generally horizontal axis.

* * * * *